UNITED STATES PATENT OFFICE.

WILLIAM WILBER, OF NEW YORK, N. Y.

IMPROVEMENT IN BURNING-FLUIDS.

Specification forming part of Letters Patent No. 23,210, dated March 8, 1859.

*To all whom it may concern:*

Be it known that I, WILLIAM WILBER, of the city, county, and State of New York, have invented or discovered a new and useful Fluid Burning Compound for Lamps, &c.; and I do hereby declare the following to be a full, clear, and exact description of the mode or manner of compounding the same and of the ingredients used.

My object is to utilize coal-tar, which is rich in carbon and oils, and which in very many places is thrown away as useless. I have discovered that nearly the whole of this coal-tar can be converted into a burning-fluid, the crude carbon being easily separated from the oil, and that this fluid has all the good properties of coal-oil, while it is much cheaper, being composed in part of a material heretofore deemed of little or no value.

To enable others skilled in the art to make and use my compound, I will proceed to describe the manner in which I prepare it.

I take coal-tar as it comes from the gas-works and pour into it camphene or alcohol and mix the two articles together. The camphene or alcohol will take up a certain portion of the coal-tar and hold it. I then pour off the mixture into a suitable vessel and let it stand until the insoluble matter settles down to the bottom of the vessel, when the purer mixture may be again drawn off. This mixture of coal-tar and, say, camphene, is further mixed with alcohol; or the alcohol may be used first with the coal-tar and the camphene put in afterward. Either of these processes are better than to mix the alcohol and camphene together and then put them into the coal-tar, or to put them all together at the outset.

The proportions of coal-tar, camphene, and alcohol which I prefer are about equal quantities, by weight, of each; but of course these proportions will vary in making a lighter or heavier burning-fluid.

This burning-fluid may be made simply by mixing the ingredients named cold, as they will clear themselves in a very short time of all the crude material that blackens the coal-tar, it being precipitated to the bottom of the vessel.

The fluid which I make so resembles coal-oil in its properties as to make it an excellent substitute for that article, while it is much cheaper than coal-oil. It is entirely non-inflammable in the lamp or in filling the lamp, and consequently a safe fluid to handle and burn. It does not evaporate to the extent that other burning-fluids do, and is economical on that score.

Having thus fully described my burning compound and the manner of making and compounding the same, what I claim is—

A fluid compound for burning in lamps, &c., made of coal-tar, camphene, and alcohol, substantially in the proportions and manner herein set forth.

WILLIAM WILBER.

Witnesses:
   THOS. H. UPPERMAN,
   A. B. STOUGHTON.